United States Patent [19]

Lauderback

[11] 4,399,186
[45] Aug. 16, 1983

[54] FOAMED ASPHALT WEATHERING SHEET FOR ROLL ROOFING, SIDING, OR SHINGLES

[75] Inventor: Sanford K. Lauderback, Newark, Ohio

[73] Assignee: Owens-Corning Fiberglas Corporation, Toledo, Ohio

[21] Appl. No.: 335,434

[22] Filed: Dec. 29, 1981

[51] Int. Cl.³ .................. B32B 5/20; B32B 11/10
[52] U.S. Cl. ............................. 428/291; 156/78; 156/337; 428/141; 428/304.4; 428/489; 428/920
[58] Field of Search .............. 428/141, 304.4, 489, 428/316.6, 920, 490, 491, 291; 156/78, 337; 264/50; 106/273 R, 277

[56] References Cited

U.S. PATENT DOCUMENTS

| | | | |
|---|---|---|---|
| 2,610,956 | 9/1952 | Derksen et al. | 260/28.5 |
| 2,642,366 | 6/1953 | Rumberger | 117/103 |
| 2,871,212 | 1/1959 | Thayer | 260/28.5 |
| 2,882,184 | 4/1959 | Trachet | 117/122 |
| 2,945,827 | 7/1960 | Henning et al. | 260/2.5 |
| 2,964,424 | 12/1960 | Mast | 117/98 |
| 2,967,467 | 1/1961 | Maude | 94/18 |
| 2,981,361 | 4/1961 | Schofield | 181/33 |
| 3,050,483 | 8/1962 | Kalil | 260/28.5 |
| 3,067,147 | 12/1962 | Rubens et al. | 260/2.5 |
| 3,922,425 | 11/1975 | Plumberg | 428/489 |
| 4,073,997 | 2/1978 | Richards et al. | 156/78 |
| 4,137,198 | 1/1979 | Sachs | 521/83 |
| 4,169,915 | 10/1979 | Heitmann | 428/921 |

OTHER PUBLICATIONS

"FoamMelt TM Systems," Nordson, Aug. 1980.
Foamix Advances, Asphalt Pavement Construction: New Materials and Techniques, ASTM STP 724 J.A. Scherocman Ed. American Society for Testing & Materials, 1980, pp. 93–109.

Primary Examiner—Paul J. Thibodeau
Attorney, Agent, or Firm—Ronald C. Hudgens; Ted C. Gillespie; Paul J. Rose

[57] ABSTRACT

In a continuous weathering sheet manufacturing process wherein fibrous mat material is coated with liquid asphalt, the asphalt is foamed before coating the mat therewith.

4 Claims, 3 Drawing Figures

FOAMED ASPHALT WEATHERING SHEET FOR ROLL ROOFING, SIDING, OR SHINGLES

TECHNICAL FIELD

This invention relates generally to asphalt weathering sheets, and more particularly to asphalt roll roofing, shingles, and siding.

BACKGROUND ART

Prior to my invention, the asphalt used by the roofing industry in manufacturing products such as roll roofing, strip shingles, and siding has not been foamed.

DISCLOSURE OF INVENTION

In accordance with the invention, a foamed asphalt weathering sheet useful in products such as roll roofing, strip shingles, and siding is disclosed. The weathering sheet may be formed by any conventional manufacturing process, essentially using conventional equipment, except that instead of the usual non-foamed liquid asphalt, a foamed liquid asphalt is used to coat the mat, additional equipment being required to foam the liquid asphalt before application thereof to the mat.

BRIEF DESCRIPTION OF DRAWINGS

The invention is described hereinafter with reference to the accompanying drawings wherein.

BEST MODE OF CARRYING OUT THE INVENTION

Figure 1:
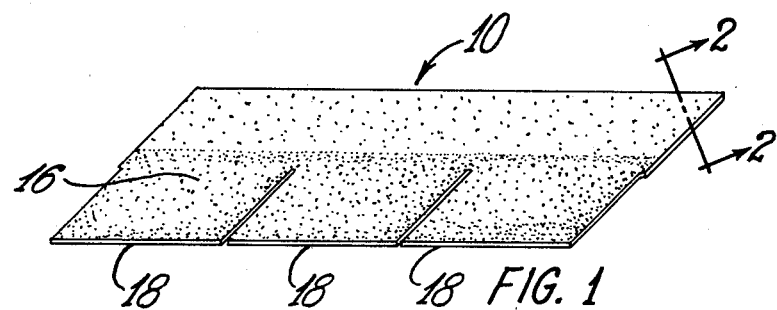
FIG. 1 is a perspective view of a strip shingle constructed in accordance with the invention.
Figure 2:
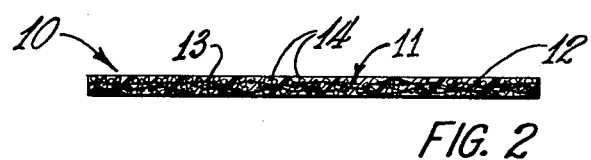
FIG. 2 is an enlarged schematic sectional view taken generally along the line 2—2 of FIG. 1.
Figure 3:
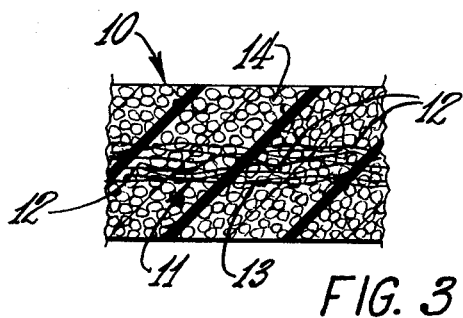
FIG. 3 is a magnified portion of the view of FIG. 2.

With reference to the drawings, FIG. 1 shows a strip shingle 10 constructed in accordance with the invention. The shingle 10 includes a mat or carrier strip 13 (FIGS. 2 and 3) preferably of wet-laid chopped glass fibers 12. The mat 13 is embedded in foamed asphalt 14. Mineral granules 16 are provided on the upper surface of the shingle, those on the normally exposed tabs 18 being of a desired color. The shingle 10 is one of a plurality cut from a larger weathering sheet otherwise useful as roll roofing or siding.

The manufacturing process may be any conventional process except that the asphalt is foamed before the mat is coated therewith. Foaming of the asphalt 14 is preferably accomplished by mechanically mixing it with air or with an inert gas such as nitrogen in a suitable machine such as those developed by Nordson Corporation, Amherst, Ohio, for foaming hot melt adhesives and disclosed in U.S. Pat. No. 4,259,402, or such as the high shear mixers available from EASE, Inc. of Tunnel Hill, Ga. A filler such as limestone dust and a polymer modifier such as styrene or rubber may be added to the asphalt before the foaming thereof if desired.

Some advantages of the foamed asphalt in roll roofing, siding, and strip shingles are as follows:

a. A reduction in the amount of asphalt required.

b. A reduction in the amount of energy used in manufacturing because of lower processing temperatures. (The foamed asphalt cools more slowly than non-foamed asphalt and need not be heated to as high a temperature.)

c. Improved adhesion of granules on the product.

d. Additional insulation value in the product.

I claim:

1. In a continuous process of manufacturing weathering sheet of the type used in products such as roll roofing, strip shingles, and siding, said process including coating a preformed flexible fibrous mat on both sides with liquid asphalt, the improvement comprising foaming the liquid asphalt before coating the mat therewith.

2. A foamed-asphalt weathering sheet of the type used in products such as roll roofing, strip shingles, and siding, said sheet comprising a fibrous mat embedded in foamed asphalt.

3. A foamed-asphalt strip shingle cut from a weathering sheet as claimed in claim 2.

4. A foamed-asphalt strip shingle as claimed in claim 3 wherein the mat is a glass fiber mat.

* * * * *